United States Patent
Winer et al.

(10) Patent No.: US 11,761,794 B2
(45) Date of Patent: Sep. 19, 2023

(54) PROXIMITY SENSOR TO SENSE ROTATING SHAFT POSITION AND VELOCITY

(71) Applicant: Hamilton Sundstrand Corporation, Charlotte, NC (US)

(72) Inventors: Gordon Elliott Winer, Prescott, AZ (US); Shihab T. A. Muhammed, Kerala (IN)

(73) Assignee: HAMILTON SUNDSTRAND CORPORATION, Charlotte, NC (US)

(*) Notice: Subject to any disclaimer, the term of this patent is extended or adjusted under 35 U.S.C. 154(b) by 116 days.

(21) Appl. No.: 17/229,235

(22) Filed: Apr. 13, 2021

(65) Prior Publication Data
US 2022/0326051 A1  Oct. 13, 2022

(51) Int. Cl.
*G01D 5/20* (2006.01)
*F16C 3/02* (2006.01)

(52) U.S. Cl.
CPC .............. *G01D 5/2006* (2013.01); *F16C 3/02* (2013.01); *F16C 2233/00* (2013.01)

(58) Field of Classification Search
CPC ..... G01D 5/12; G01D 5/14; G01D 5/20–2291
See application file for complete search history.

(56) References Cited

U.S. PATENT DOCUMENTS

| | | | |
|---|---|---|---|
| 4,142,153 A | 2/1979 | Smith | |
| 5,367,257 A | 11/1994 | Garshelis | |
| 5,371,460 A | 12/1994 | Coffman et al. | |
| 5,523,679 A | 6/1996 | Kalb | |
| 5,977,765 A | 11/1999 | Gibson et al. | |
| 8,001,850 B2 | 8/2011 | Hedayat et al. | |
| 8,203,334 B2 | 6/2012 | Baller et al. | |
| 2005/0083041 A1* | 4/2005 | Schwartzbart | G01D 5/2013 324/207.17 |
| 2007/0101811 A1* | 5/2007 | Nyce | G01P 3/50 73/304 C |

(Continued)

FOREIGN PATENT DOCUMENTS

| | | |
|---|---|---|
| JP | H0626808 A | 2/1994 |
| WO | 2014053835 A2 | 4/2014 |

OTHER PUBLICATIONS

Search Report issued in European Patent Application No. 22166831.2; Application Filing Date Apr. 5, 2022; dated Aug. 18, 2022 (10 pages).

*Primary Examiner* — Huy Q Phan
*Assistant Examiner* — David B Frederiksen
(74) *Attorney, Agent, or Firm* — CANTOR COLBURN LLP

(57) ABSTRACT

A shaft monitoring system includes a rotatable shaft having a target element coupled thereto that rotates along with the shaft. A proximity sensor is located adjacent to the target element. The proximity sensor measures an inductance of the target element based on one or both of a volume of the target element and a distance between the target element and the proximity sensor, and generates a proximity sensor output signal based on the measured inductance. A signal processing system determines at least one of a position of the shaft, a rotational speed of the shaft, and a rotational direction of the shaft based on the proximity sensor output signal.

18 Claims, 12 Drawing Sheets

(56) References Cited

U.S. PATENT DOCUMENTS

| | | | | |
|---|---|---|---|---|
| 2007/0289395 A1* | 12/2007 | Hirzmann | ........... | G01D 5/34776 |
| | | | | 73/865.9 |
| 2010/0207609 A1* | 8/2010 | Erickson | ................ | G01D 5/145 |
| | | | | 324/207.13 |
| 2010/0308803 A1* | 12/2010 | Schaeuble | ............ | G01D 5/2455 |
| | | | | 324/207.15 |
| 2013/0021023 A1* | 1/2013 | Niwa | ....................... | G01B 7/30 |
| | | | | 324/207.15 |
| 2013/0057259 A1* | 3/2013 | Burkhardt | ............ | G01D 5/2457 |
| | | | | 324/207.11 |
| 2013/0145847 A1 | 6/2013 | Martin et al. | | |
| 2014/0247040 A1* | 9/2014 | Reitsma | ................. | H03H 2/005 |
| | | | | 324/207.15 |
| 2015/0211895 A1 | 7/2015 | Reitsma et al. | | |
| 2017/0292628 A1 | 10/2017 | Dolenti | | |
| 2017/0292857 A1* | 10/2017 | Leidich | .............. | G01R 27/2611 |
| 2020/0033160 A1* | 1/2020 | Kim | ....................... | G01D 5/204 |
| 2020/0200789 A1 | 6/2020 | Shepherd et al. | | |

\* cited by examiner

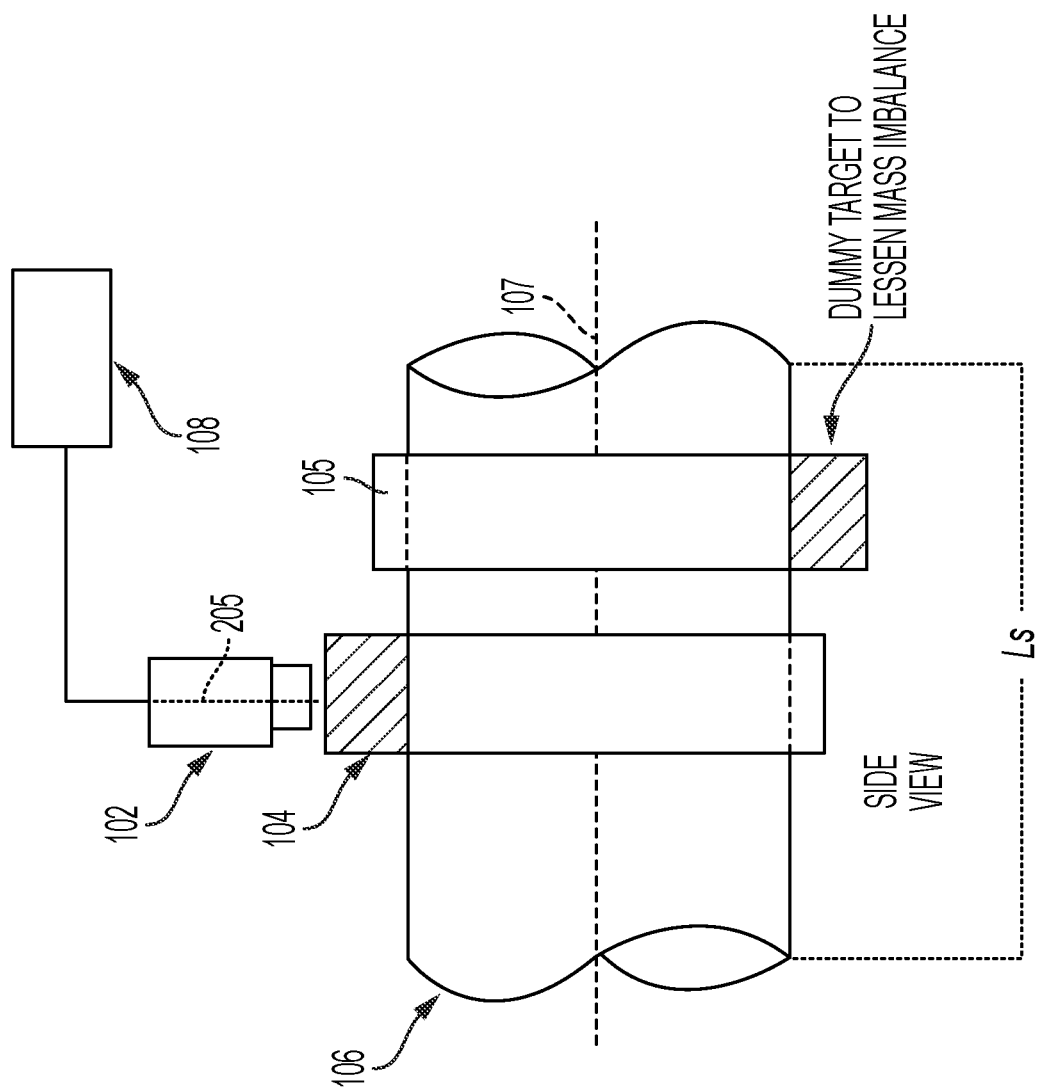
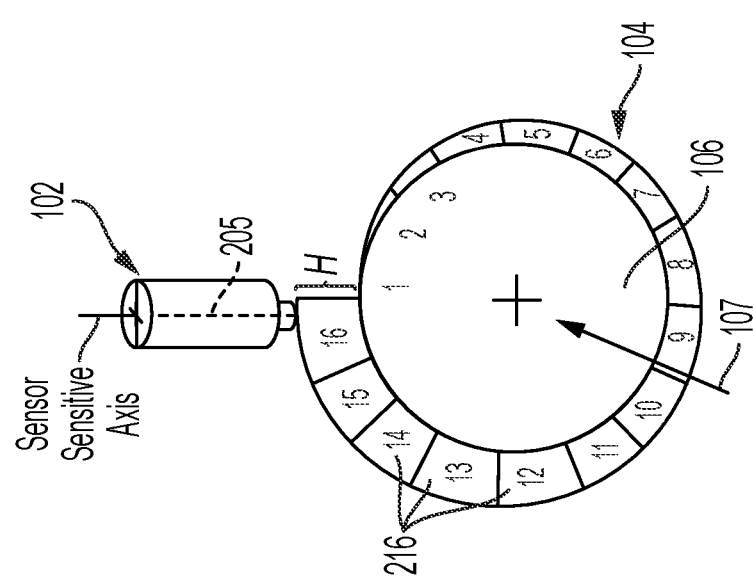
FIG. 3A
FIG. 3B

PROXIMITY SENSOR TO SENSE ROTATING SHAFT POSITION AND VELOCITY

BACKGROUND

The present invention generally relates to electromechanical systems, and more particularly, to a system to monitor a position, and velocity of a rotating shaft.

Vehicle electromechanical systems commonly employ rotatable shafts to adjust the position of one or more components on the vehicle. Aircrafts, for example, include flaps, slats, landing gears, etc. that are adjusted in response to rotating a shaft in a clockwise and counterclockwise direction. Not only is it desirable to measure velocity (i.e., speed and direction) of the rotating shaft to ensure the moveable component is not adjusted too quickly or whether it is moved at all, but it is also desirable to measure the position of the shaft in order to determine the current adjusted position of the moveable component, i.e., whether a given flap is open or closed. Thus, the rotational position of the shaft provides a corresponding relationship to the adjusted position of the moveable component (e.g., flat, slat, landing gear, etc.)

In other instances, some vehicles including aircraft employ dual-function dynamoelectric machine that can be utilized as both a motor and as a generator. In some situations, it is necessary to detect the position, speed and direction of the dynamoelectric machine's rotating shaft in order to sustain operation of the machine for applications operating at low speeds or at a standstill (e.g., zero speed), along with detecting a seized shaft or broken shaft.

BRIEF DESCRIPTION

Embodiments of the present invention are directed to a shaft monitoring system. The shaft monitoring system includes a rotatable shaft having a target element coupled thereto that rotates along with the shaft. A proximity sensor is located adjacent the target element. The proximity sensor measures an inductance of the target element based on one or both of a volume of the target element and a distance between the target element and the proximity sensor, and generates a proximity sensor output signal based on the measured inductance. A signal processing system determines at least one of a position of the shaft, a rotational speed of the shaft, and a rotational direction of the shaft based on the proximity sensor output signal.

Embodiments of the present invention are directed to a method of monitoring a rotatable shaft. The method comprises positioning a target element coupled to a rotatable shaft a distance away from a proximity sensor and measuring, via the proximity sensor, an inductance based on one or both of a volume of the target element and a distance between the target element and the proximity sensor. The method further comprises generating a proximity sensor output signal based on the measured inductance. The method further comprises determining, via a signal processing system in signal communication with the proximity sensor, at least one of a position of the shaft, a rotational speed of the shaft, and a rotational direction of the shaft based on the proximity sensor output signal.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

FIG. 3A is a front-view of a target element coupled to a shaft according to a non-limiting embodiment of the present disclosure;

FIG. 3B is a side-view of the target element shown in FIG. 3A according to a non-limiting embodiment of the present disclosure;

Figure 1:
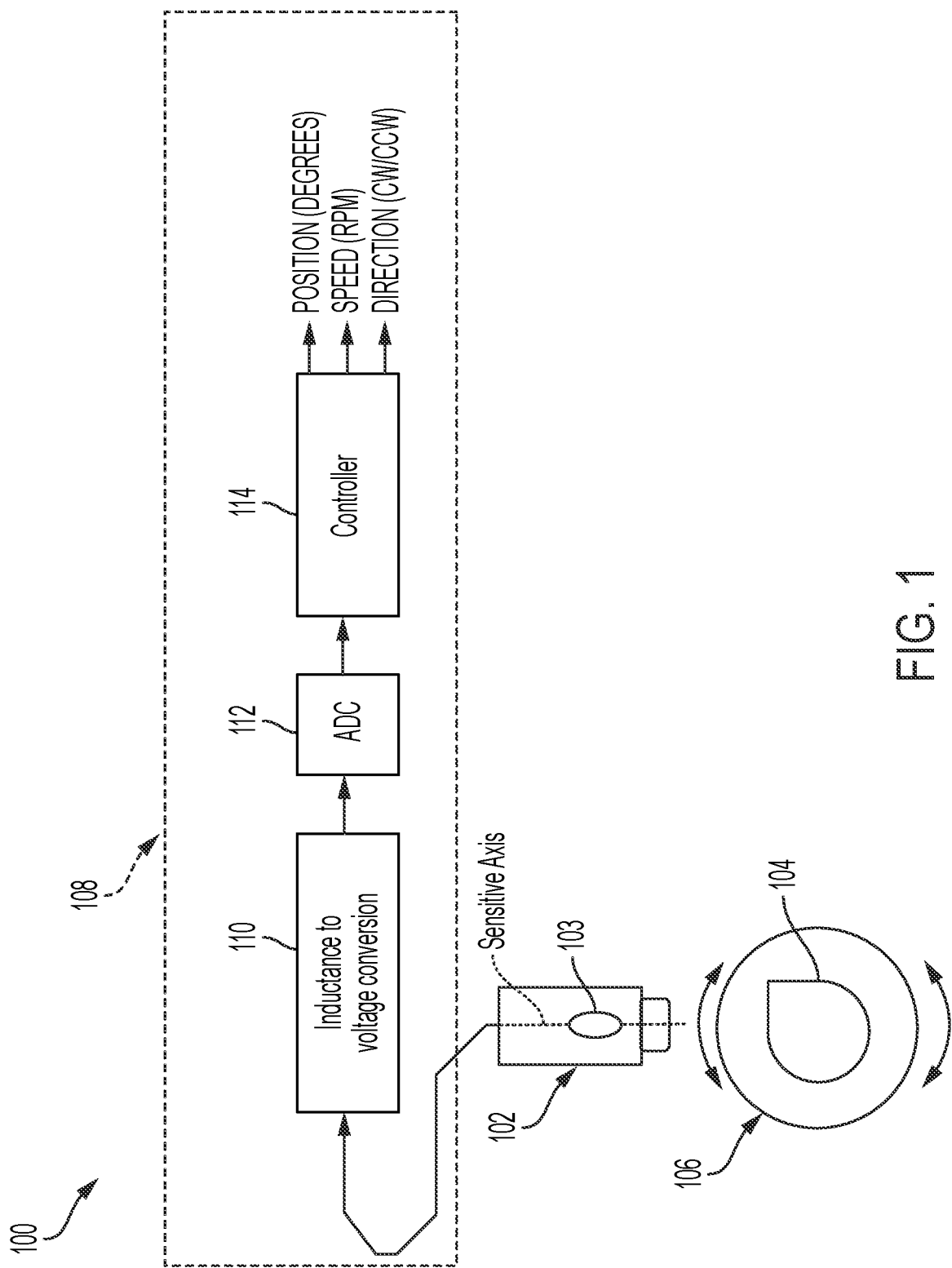
FIG. 1 is a block diagram of a shaft monitoring system configured to monitor a shaft according to a non-limiting embodiment of the present disclosure.

The diagrams depicted herein are illustrative. There can be many variations to the diagram or the operations described therein without departing from the spirit of the invention. For instance, the actions can be performed in a differing order or actions can be added, deleted or modified. Also, the term "coupled", and variations thereof describes having a communications path between two elements and does not imply a direct connection between the elements with no intervening elements/connections between them. All of these variations are considered a part of the specification.

DETAILED DESCRIPTION

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

A wide-variety of devices have traditionally been used to measure the rotational position of a shaft such as, for example, rotary encoders, rotary-optical encodes (sometimes simply referred to as optical encoders), resolvers that determine position based on sine and cosine output voltages, and synchro encoders that determine position based on relative voltage magnitudes between three output wires. Rotary encoders such as incremental encoders and absolute optical encoders, for example, have been traditionally employed with shafts to indicate an angular positional range of a rotated shaft. Incremental encoders generate a certain number of pulses per revolution with each pulse corresponding to a defined resolution. Every time an incremental encoder is switched on the pulse is counted from zero. In other words the position is not stored and a 'reset or reference' position must be obtained before the encoder begins counting again. Consequently, an incremental encoder can measure the change in position but not the absolute position.

An absolute optical encoder maintains position information when power is removed from the encoder. The relationship between the encoder value and the physical position of the controlled machinery is set at assembly and the system does not need to return to a calibration point to maintain position accuracy. However, absolute optical encoders require multiple code rings with various binary weightings which provide a data word representing the absolute position of the encoder within one revolution. Additional code wheels and gears must be implemented to increase the precision of the encoder, which in turn increases overall costs and weight.

Incremental encoders and absolute optical encoders both output a binary encoding signal that provides information associated with the shaft. In this case of an incremental encoder, the output binary encoding signal provides information about the motion of the shaft, but provides no information pertaining to a specific position and/or direction of the shaft. The output binary encoding signal of an absolute optical encoder may provide a general angular range of the shaft, but provides no information pertaining to a specific direction of the shaft.

Various non-limiting embodiments of the disclosure provide a shaft monitoring system that employs a proximity sensor configured to measure rotation of a proximity sensor target element (hereinafter referred to a target element) coupled to a rotating shaft. The target element includes a series of individual target sections that are sensed by the proximity sensor as the shaft rotates. The profiles and/or volumes of the individual target sections continuously change as the target element extends from the first individual target section included in the series to the last individual target section. The volume of each sensed target section with respect to the proximity sensor produces a different inductance as indicated by the proximity sensor output signal. Over a full rotation of the shaft, the proximity sensor output signal itself not only indicates a position of the shaft, but also can indicate both the rotational direction and rotational speed of the shaft.

Turning now to FIG. 1, a shaft monitoring system 100 is illustrated according to a non-limiting embodiment of the present disclosure. The shaft monitoring system 100 includes a proximity sensor 102 configured to monitor a target element 104 coupled to a shaft 106, and a signal processing system 108 configured to process the output signal generated by the proximity sensor 102.

The signal processing system 108 includes an inductance-to-voltage converter (IVC) 110, an analog-to-digital converter (ADC) 112 and a controller 114. The IVC 110 receives a proximity sensor output signal indicative of a measured inductance between the proximity sensor and the target element 104, and converts the measured inductance into an analog voltage signal. The ADC 112 receives the analog voltage signal and converts it into a digital signal indicative of the measured inductance. The controller 114 processes the digital signal to determine the angular position of the shaft (e.g., degree of rotation), the speed of the shaft (e.g., rotations per minute (RPM)), and rotational direction of the shaft (e.g., clockwise rotation or counter clockwise rotation). The speed of the shaft and rotational direction of the shaft together can define a velocity of the shaft. Accordingly, the proximity sensor output signal itself can provide the angular position of the shaft, the speed of the shaft, and the rotational direction of the shaft without requiring additional sensors and/or software algorithms to determine shaft speed and shaft direction.

The proximity sensor 102 can be positioned near the shaft 106, which includes the proximity sensor target element 104 (hereinafter referred to a target element 104) coupled thereto. The proximity sensor 102 includes an inductive sensing element 103, while the target element 104 is formed from various materials including, but not limited to, metal and ferrous materials. Energizing the inductive sensing element 103 (e.g., using an alternating current (AC) signal) induces a magnetic field, which can interact with the target element 104. For example, a change in distance between the proximity sensor 102 and the target element 104 varies the strength of the magnetic field, and in turn varies the inductance of the sensing element 103.

With this in mind, the target element 104 can be coupled to the shaft 106 in a manner that allows the distance between the proximity sensor 102 and the target element 104 to change as the shaft 106 rotates. Such an arrangement causes the inductance of the sensing element 103 to also change as the shaft 106 rotates, thereby producing a relationship between the measured inductance indicated by the proximity sensor output signal and the rotational position of the shaft 106. In this manner, the proximity sensor output signal alone can be processed by the signal processing system 108 to determine the shaft position, shaft speed and shaft direction.

Turning to FIGS. 2-6, operating concepts of the proximity sensor 102 and a target element 104 are illustrated according to non-limiting embodiments of the present disclosure. In the examples described with respect to the various embodiments of the application, the target element 104 comprises a ferromagnetic material and is illustrated as being coupled to an outer surface of the shaft 106. In one or more non-limiting embodiments, the target element 104 also extends 360 degrees about a shaft axis from one target element end (e.g., a first target section) to an opposite target element end (e.g., a last target section) to define circumferential profile. It should be appreciated, however, that the inventive concept is not limited to the aforementioned arrangement and that other arrangements of the target element 104 and shaft 106 can be implemented without departing from the scope of the invention.

The proximity sensor 102 includes a housing 200 that contains an inductive coil 202 (sometimes referred to as a "winding") that is wound around a core 204. The inductive coil 202 can be formed from various materials including, but not limited to metal. The core 204 extends along a center axis 205 to define a core length (L), and can be formed from various materials including, but not limited to metal, ferrite, and ferromagnetic material. Although the inductive coil is illustrated as having three turns, the proximity sensor 102 is not limited thereto and more or less turns can be implemented without departing from the scope of the invention.

The inductive coil 202 includes opposing first and second ends 208 and 210 that are electrically connected to an alternating current (AC) source 206. Accordingly, the AC source 206 delivers AC current through the inductive coil 202 so as to induce an electromagnetic field. The first and second ends 208 and 210 are also electrically connected to the signal processing system 108 via terminals 212 and 214. The inductance of the coil 202 is applied to terminals 212 and 214 in the form of a proximity sensor output signal, and delivered to the signal processing system 108. In this manner, the proximity sensor output signal can be processed by the signal processing system 108 to determine the shaft position, shaft speed and shaft direction as described herein.

FIGS. 3A and 3B illustrate an example of the target element 104 in greater detail. The target element 104 is formed on an outer surface of the shaft 106, which extends along the rotational center axis 107 to define a shaft length (Ls). The target element 104 has a varying volume, which can be sensed by the proximity sensor 102 as the shaft 106 rotates.

In a non-limiting embodiment, the target element 104 can include a series of target sections that can be sensed by the proximity sensor 102. Although sixteen target sections 216 are illustrated (labeled 1 through 16), it should be appreciated that the target element 104 can include more or less target sections 216 without departing from the scope of the invention. Distinct target sections 216 are shown for ease of illustration. It should be appreciate that the target sections 216 can be integrally formed to define a single contiguous target element 104 having a changing volume as described herein.

The profiles (e.g., height, width and/or volume) of the individual target sections 216 continuously change as the target element 104 extends from the first individual target section 216 (e.g., section 1) located at one end of the target element 104 to the last individual target section 216 (e.g., section 16) located at the opposite end of the target element 104. In a non-limiting embodiment, the first target element 216 can be formed to have a minimum volume of the target element 104 while the last target element 216 can be formed to have a maximum volume of the target element 104. Accordingly, the target element 104 will present an ambiguous position once per 360 degrees, which is when the first target element 216 or the last target element 216 is aligned beneath the proximity sensor 102.

The profile of each sensed target section 216 with respect to the proximity sensor 102 produces a different measured inductance, which is reflected by the proximity sensor output signal delivered to the signal processing system 108. In a non-limiting embodiment, the target element 104 is also shown as having an inclined or ramp profile. It should be appreciated, however, that the target element 104 can have a different profile. For example, the target element 104 can have a step-like profile that include a series of steps that change in volume from the first section (e.g., section 1) to the last section (e.g., section 16).

In one or more non-limiting embodiments, a dummy target element 105 can be coupled to the outer surface of the shaft 106 and adjacent to the target element 104 as shown in FIG. 3B. The dummy target element 105 can have a mirror image profile with respect to the target element 104. In this manner, the dummy target element 105 can serve as a counterweight to the target element 104 and improve the balance of the rotating shaft 106.

Figure 2:
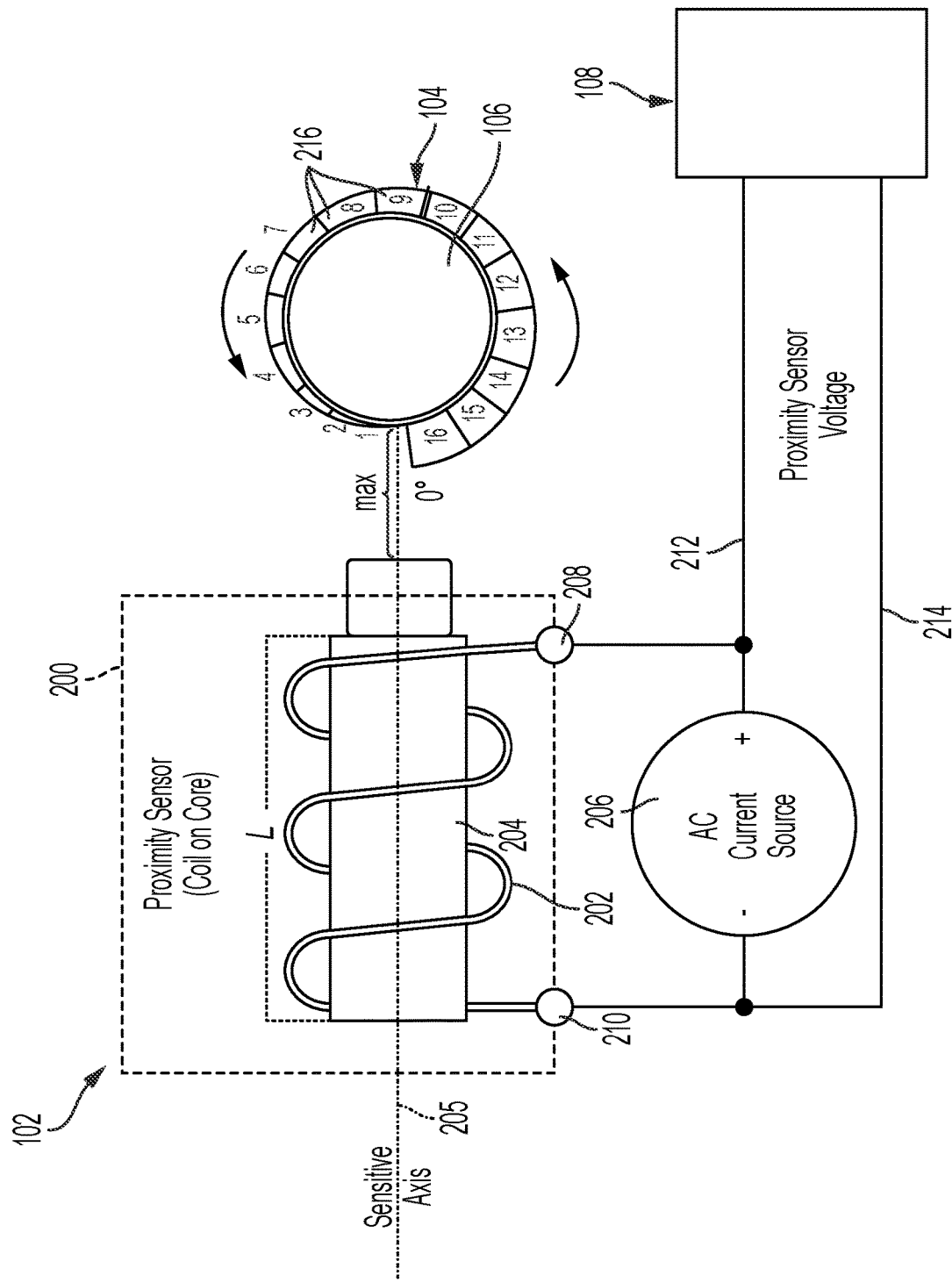
FIG. 2 is a block diagram of a proximity sensor monitoring a first position of target element coupled to a shaft according to a non-limiting embodiment of the present disclosure.

Referring collectively to FIGS. 2, 3A and 3B, the proximity sensor 102 is illustrated measuring the target element 104 while the shaft 106 is in a first position. According to a non-limiting embodiment, the proximity sensor 102 is positioned such that the sensor axis 205 is perpendicular with respect to the rotational center axis 107 of the shaft 106 and a first target section 216 (e.g., target section 1) is aligned with the axis 205 of the proximity sensor 102. In this example, target section 1 has a profile of being the lowest-volume target section 216 or the target section 216 with the lowest height (H) (and the largest distance from the sensor 102 when located in proximity of the sensor 102) extending from the surface of the shaft 106 and perpendicular to the rotational center axis 107. Accordingly, a maximum distance is defined between the proximity sensor 102 and the target element 104 such that the coil 202 realizes a minimum inductance.

Figure 4:
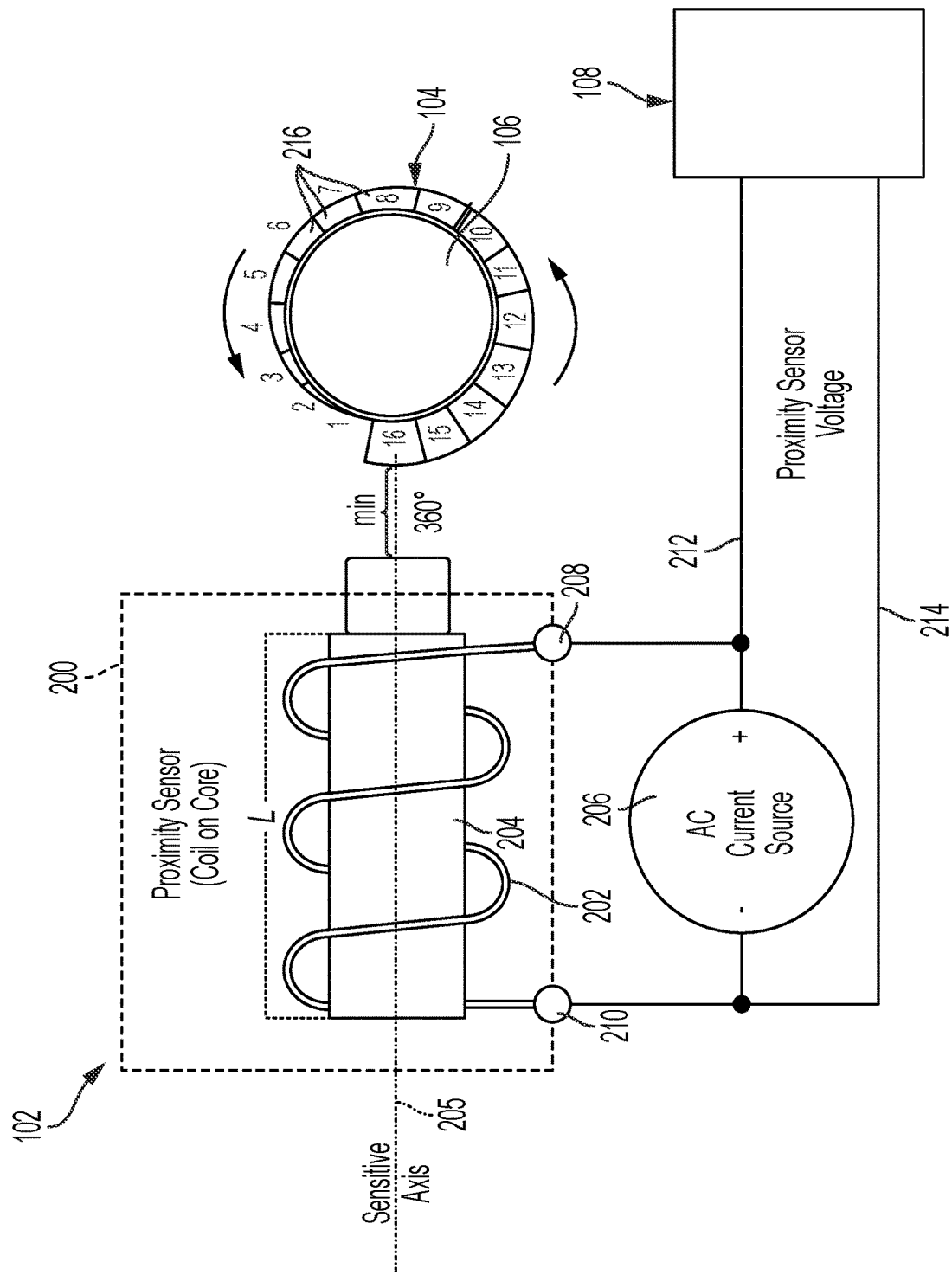
FIG. 4 is a block diagram of a proximity sensor monitoring a second position of a target element included on a shaft according to a non-limiting embodiment of the present disclosure.

Turning to FIG. 4, the proximity sensor 102 is illustrated measuring the target element 104 while the shaft 106 is rotated counter-clockwise (in almost a full rotation) into a second position from the first position shown in FIG. 2. While in the second position, a second target section 216 (e.g., target section 16) is aligned with the axis 205 of the proximity sensor 102. In this example, target section 16 has a profile of being the largest-volume target section 216 or the target section 216 with the greatest height extending from the surface of the shaft 106. Accordingly, a minimum distance is defined between the proximity sensor 102 and the target element 104 such that the coil 202 realizes a maximum inductance.

Figure 5:
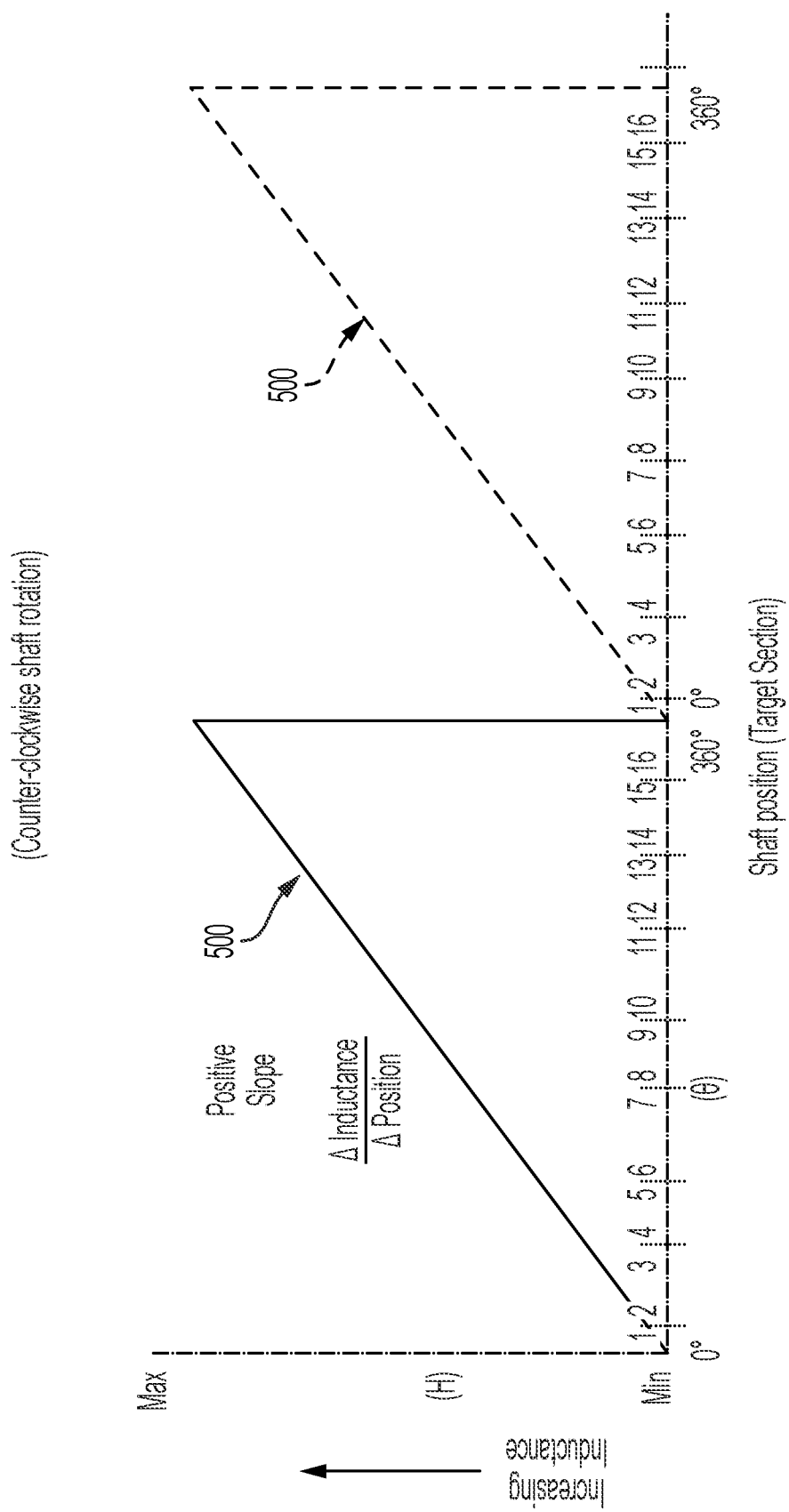
FIG. 5 is a diagram of a signal output by the proximity sensor in response to monitoring the target element rotating in a first direction according to a non-limiting embodiment of the present disclosure.

FIG. 5 illustrates the proximity sensor output signal 500 generated by the proximity sensor 102 in response to measuring the counter-clockwise rotation of the target element 104 from 0 degrees (0°) to 360 degrees (360°) as described above with respect to FIGS. 2 and 4. At 0°, the lowest volume target section 216 (e.g., section 1) of the target element 104 is aligned with the axis 205 such that the distance between the proximity sensor 102 and the target element 104 is at its maximum. As a result, the inductance of the coil 202 is at its minimum (Min). As the shaft 106 rotates counter-clockwise, the target sections 216 increase in volume (e.g., height). Accordingly, the inductance of the coil 202 gradually increases until the largest volume target section 216 (e.g., section 16) of the target element 104 is aligned with the axis 205. As a result, the inductance of the coil 202 is at its maximum (Max), thereby defining a proximity sensor output signal 500 having a positive slope.

It should be appreciated that the proximity sensor output signal 500 illustrated in FIG. 5 is generated using a target element 104 comprising a ferro-magnetic material and a coil 202 of the proximity sensor 102 excited at a low-frequency (e.g., frequency where the effects of magnetic permeability is greater than the effects of eddy current). In another non-limiting embodiment, a target element 104 comprising a non-magnetic metallic material and a coil 202 excited at a low-frequency (e.g., frequency where the effects of magnetic permeability is greater than the effects of eddy current) can result in a measured inductance that decreases as the shaft 106 rotates counter-clockwise. As a result, the output signal 500 will have a negative slope.

In another embodiment, the target element 104 can comprise a ferro-magnetic material and the coil 202 of the proximity sensor 102 can be excited at a high-frequency (e.g., frequency where the effects of magnetic permeability is less than the effects of eddy current). Accordingly, the measured inductance may decreases as the shaft 106 rotates counter-clockwise. As a result, the output signal 500 will have a negative slope.

Figure 6:
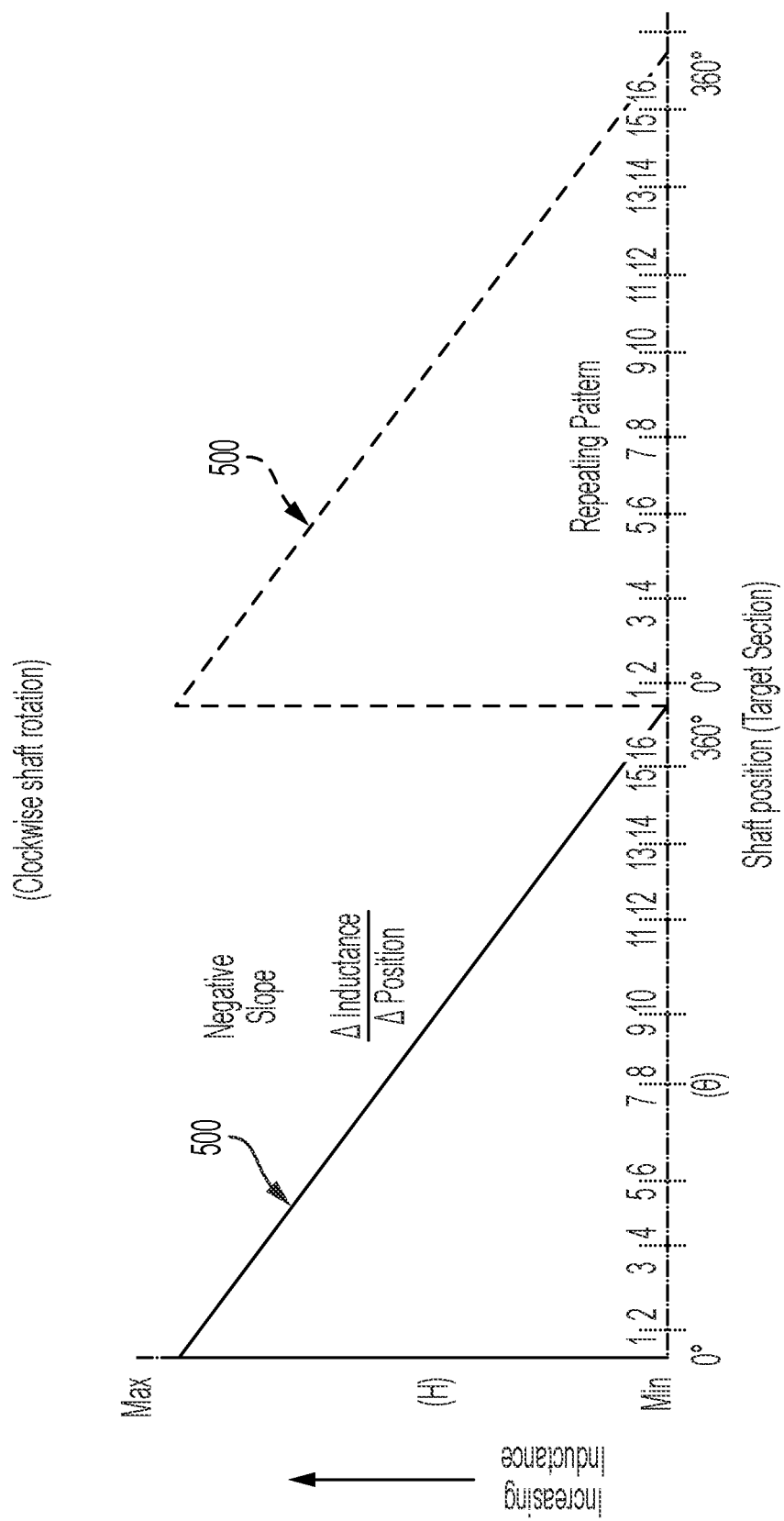
FIG. 6 is a diagram of a signal output by the proximity sensor in response to monitoring the target element rotating in a second direction according to a non-limiting embodiment of the present disclosure.

FIG. 6 illustrates a proximity sensor output signal 500 generated by the proximity sensor 102 in response to measuring a clockwise rotation of the target element 104 from 0° to 360° as described above with respect to FIGS. 3 and 4. At 0°, the largest volume target section 216 (e.g., section 16) of the target element 104 is aligned with the axis 205 such that the distance between the proximity sensor 102 and the target element 104 is at its minimum. As a result, the inductance of the coil 202 is at its maximum (Max). As the shaft 106 rotates clockwise, the target sections 216 decrease in volume (e.g., height). Accordingly, the inductance of the coil 202 gradually decreases u the lowest volume target section 216 (e.g., section 1) of the target element 104 is aligned with the axis 205. As a result, the inductance of the coil 202 is at its minimum (Min), thereby defining a proximity sensor output signal 500 having a negative slope.

As described herein, the proximity sensor output signal 500 alone can be utilized to determine position, speed and direction of the shaft 106. For instance, the proximity sensor output signal 500 can be converted into a digital signal using the ADC 112 (see FIG. 1), which is then processed by the controller 114. The controller 114 can compute the rotational position of the shaft 106 based on the amplitude of the proximity sensor output signal 500. For example, each rotational angle of the shaft can be associated with a inductance or inductance range. In at least one non-limiting embodiment, a unique inductance is associated with each angle, notwithstanding the ambiguity that may be present at the interface between minimum volume portion of the target element and the maximum volume portion of the target element 104. This ambiguity can be resolved using a software algorithm programmed in the controller 114.

Accordingly, a given amplitude proximity sensor output signal 500 can indicate a particular rotational angle, i.e., position of the shaft 106. The controller 114 can compute the speed of the shaft 106 based on the period of the proximity sensor output signal 500. That is, the change in position of the change in time indicates the rotational speed of the shaft 106. Lastly, the controller 114 can compute the direction of the shaft 106 based on the slope of the proximity sensor output signal 500. For example, a proximity sensor output signal 500 having a positive slope (see FIG. 5) indicates the shaft 106 is rotating in a counter-clockwise direction. On the other hand, proximity sensor output signal 500 having a negative slop (see FIG. 6) indicates the shaft 106 is rotating in a clockwise direction.

Figure 7C:
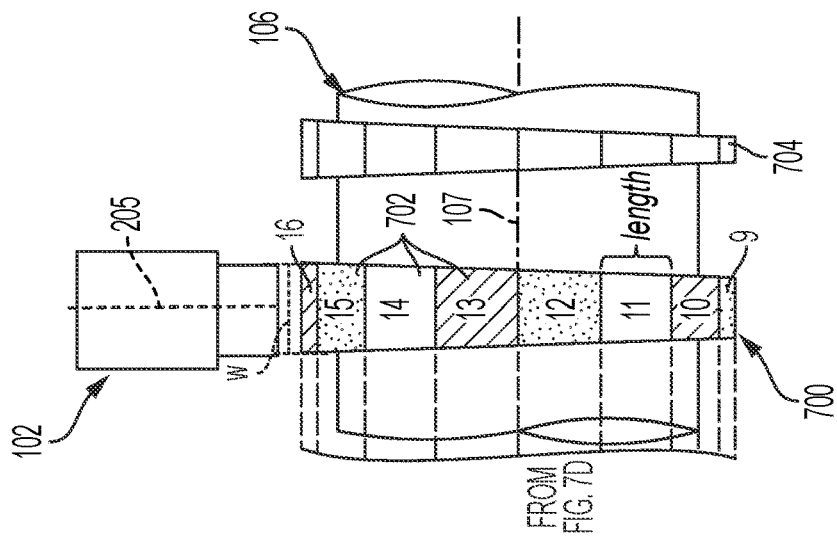
FIG. 7C is an opposing side-view of the target element shown in FIGS. 7A and 7B according to a non-limiting embodiment of the present disclosure.
Figure 7B:
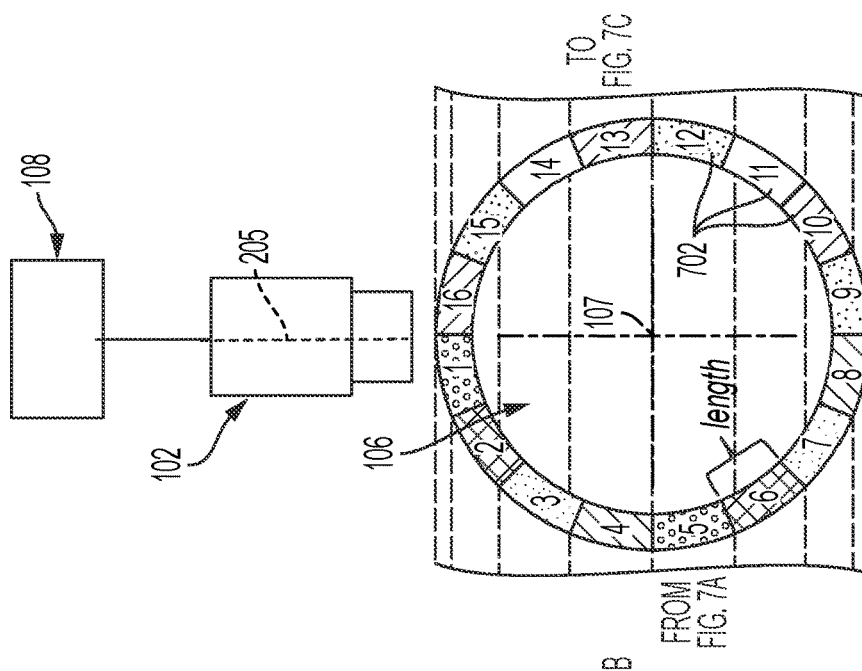
FIG. 7B is a front-view of the target element shown in FIG. 7A according to a non-limiting embodiment of the present disclosure.
Figure 7A:
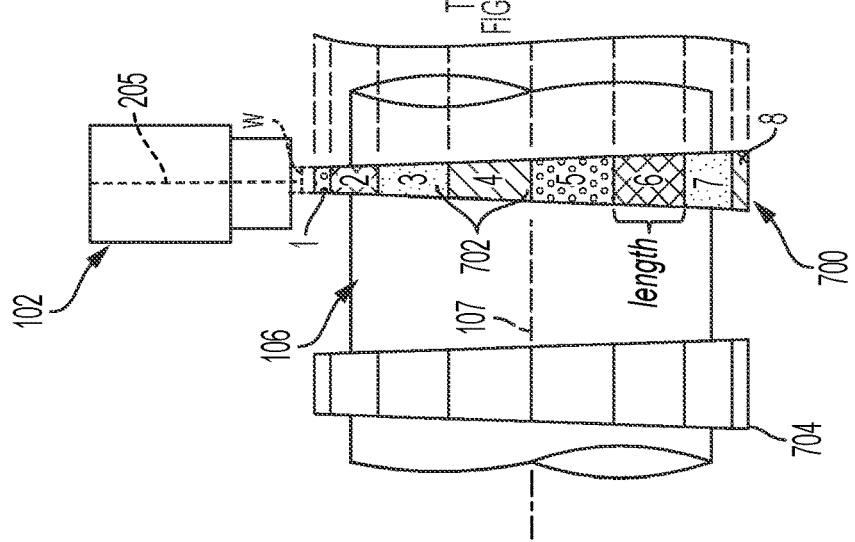
FIG. 7A is a first side-view of a target element coupled to a shaft according to a non-limiting embodiment of the present disclosure.

Referring now to FIGS. 7A, 7B and 7C, an arrangement of a proximity sensor 102 and a target element 700 coupled to a shaft 106 is illustrated according to another non-limiting embodiment. The target element 700 is formed on an outer surface of the shaft 106, which extends along a rotational center axis 107 to define a shaft length (Ls). The target element 104 includes a series of individual target sections 702 that can be individually sensed by the proximity sensor 102 as the shaft 106 rotates. Although sixteen target sections 702 are illustrated (labeled 1 through 16), it should be appreciated that the target element 700 can include more or less target sections 702 without departing from the scope of the invention. As described herein, distinct sections 702 are shown for ease of illustration. It should be appreciated that the sections 702 can be integrally formed to define a single contiguous target element 700 having a changing volume.

The profiles of the individual target sections 702 continuously change as the target element 700 extends from the first individual target section (e.g., section 1) to the last individual target section (e.g., section 16). In this example, the changing profiles include varying widths (w) of the individual target sections 702. Although the first target section 702 (section 1) is shown as having the smallest width (w) while the last target section 702 (section 16) is shown as having the largest width (w), it should be appreciated that the first target section 702 (section 1) can have the largest width (w) while the last target section 702 (section 16) can have the smallest with without departing from the scope of the invention.

In one or more non-limiting embodiments, a dummy target element 704 can be coupled to the outer surface of the shaft 106 and adjacent to the target element 700 as shown in FIGS. 7A and 7C. The dummy target element 704 can have a mirror image profile with respect to the target element 700. In this manner, the dummy target element 704 can serve as a counterweight to the target element 700 and improve the balance of the rotating shaft 106.

The widths of the individual target sections 702 extend parallel to the rotational center axis 107 of the shaft 106. As the shaft 106 rotates, target sections 702 of varying widths (and thus varying volumes) are aligned with the center axis 205. Accordingly, each sensed target section 702 produces a different measured inductance, which is reflected by the proximity sensor output signal delivered to the signal processing system 108. As described herein, a unique inductance is associated with each angle, notwithstanding the ambiguity that may be present at the interface between minimum volume portion of the target element and the maximum volume portion of the target element 104. This ambiguity can be resolved using a software algorithm programmed in the controller 114.

Figure 8:
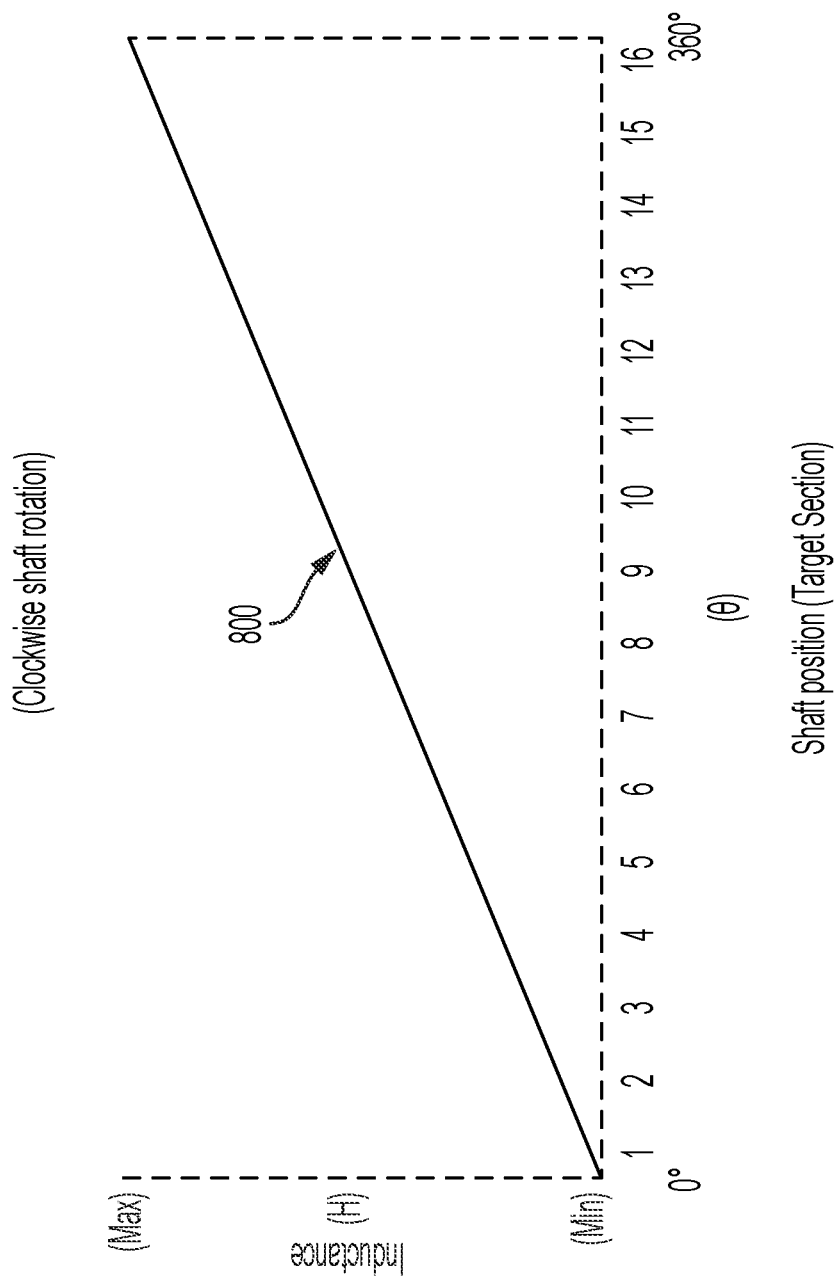
FIG. 8 is a diagram of a signal output by the proximity sensor in response to monitoring the target element shown in FIGS. 7A, 7B and 7C according to a non-limiting embodiment of the present disclosure.

FIG. 8 illustrates the proximity sensor output signal 800 generated by the proximity sensor 102 in response to measuring the clockwise rotation of the target element 700 from 0° to 360° as described above with respect to FIGS. 7A-7C. At 0°, the lowest volume target section 702 (e.g., section 1) of the target element 700 is aligned with the center axis 205. As a result, the inductance of the coil 202 is at its minimum (Min). As the shaft 106 rotates clockwise, the target sections 702 increase in width and volume. Accordingly, the inductance of the coil 202 gradually increases until the largest volume target section 702 (e.g., section 16) of the target element 700 is aligned with the center axis 205. As a result, the inductance of the coil 202 is at its maximum (Max), thereby defining a proximity sensor output signal 500 having a positive slope. Although the proximity sensor output signal 800 is described in terms of a clockwise rotation of the target element 700, the target element 700 can be rotated counter-clockwise to generate a proximity sensor output signal 800 having a negative slope without departing from the scope of the invention.

It should be appreciated that the proximity sensor output signal 800 illustrated in FIG. 8 is generated using a target element 700 comprising a ferro-magnetic material and a coil 202 of the proximity sensor 102 excited at a low-frequency (e.g., frequency where the effects of magnetic permeability is greater than the effects of eddy current). In another non-limiting embodiment, a target element 700 comprising a non-magnetic metallic material and a coil 202 excited at a low-frequency (e.g., frequency where the effects of magnetic permeability is greater than the effects of eddy current) can result in a measured inductance that decreases as the shaft 106 rotates counter-clockwise. As a result, the output signal 700 will have a negative slope.

In another embodiment, the target element 700 can comprise a ferro-magnetic material and the coil 202 of the proximity sensor 102 can be excited at a high-frequency (e.g., frequency where the effects of magnetic permeability is less than the effects of eddy current). Accordingly, the measured inductance may decreases as the shaft 106 rotates counter-clockwise. As a result, the output signal 700 will have a negative slope.

Figure 9:
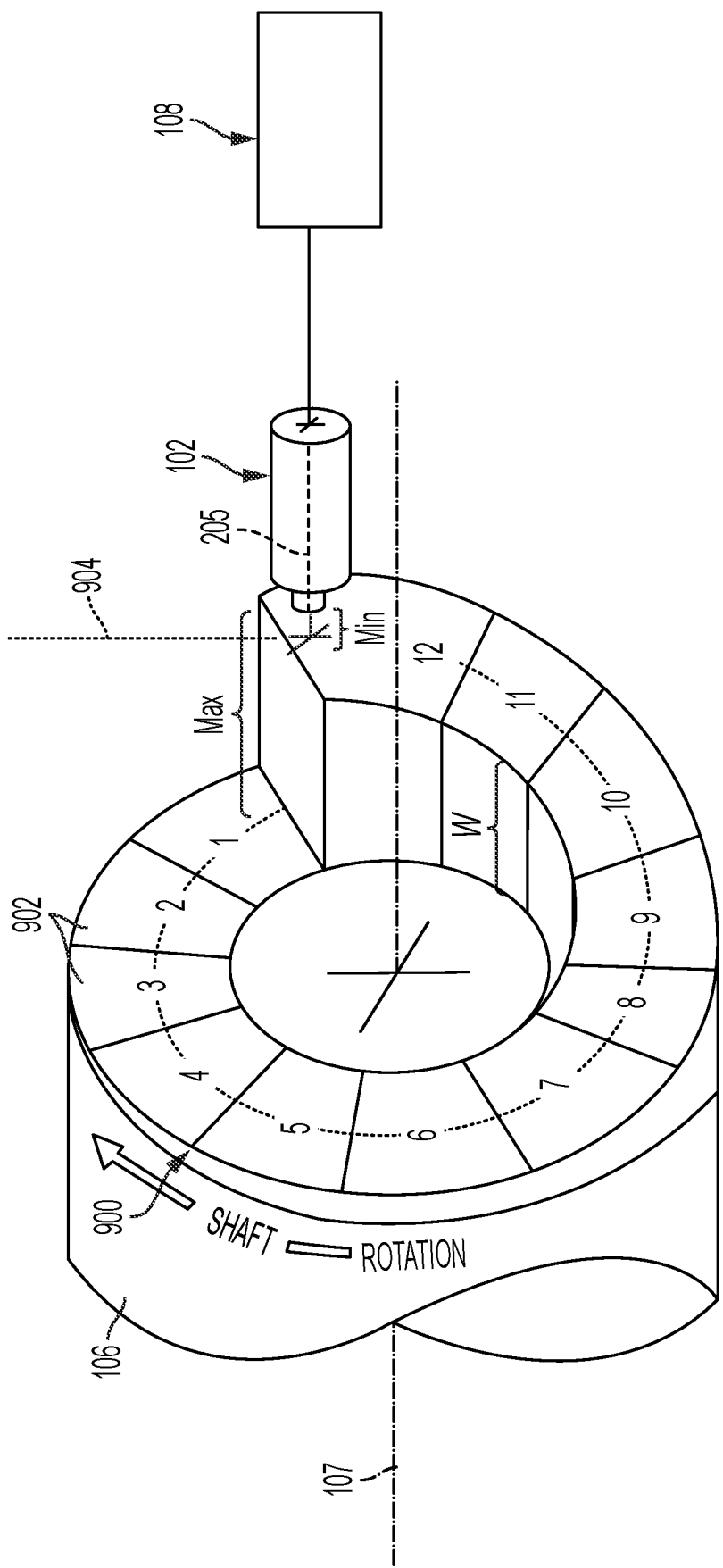
FIG. 9 is a side-view of a target element coupled to a shaft according to a non-limiting embodiment of the present disclosure.

Turning now to FIG. 9, an arrangement of a proximity sensor 102 and a target element 900 coupled to a shaft 106 is illustrated according to another non-limiting embodiment. The target element 900 is formed on an end of the shaft 106 and is aligned with the shaft center axis 107. Accordingly, both the shaft 106 and the target element 900 rotate about the center axis 107.

The target element 900 includes a series of individual target sections 902 that can be individually sensed by the proximity sensor 102 as the shaft 106 rotates. Although 12 target sections 902 are illustrated (labeled 1 through 12), it should be appreciated that the target element 900 can include more or less target sections 902 without departing from the scope of the invention. As described herein, distinct sections 902 are shown for ease of illustration. It should be appreciate that the target sections 902 can be integrally formed to define a single contiguous target element 900 having a changing volume.

In at least one non-limiting embodiment shown in FIG. 9, the proximity sensor 102 is positioned such that the sensor axis 205 is parallel with respect to the rotational center axis 107 of the shaft 106. However, the proximity sensor 102 is offset with respect to the rotational center axis 107 such that it is substantially aligned with a target center line 904 that extends along the centers of the target sections 902. In this example, a first target section 902 (e.g., target section 12) is aligned with the axis 205 of the proximity sensor 102 and has a profile of being the largest-volume target section 216 or the target section 216 with the greatest width (w) extending from the surface of the shaft 106 and parallel with the rotational center axis 107. Accordingly, a minimum distance is defined between the proximity sensor 102 and the target element 902 (e.g., target section 12) such that the coil 202 realizes a maximum inductance.

Figure 10:
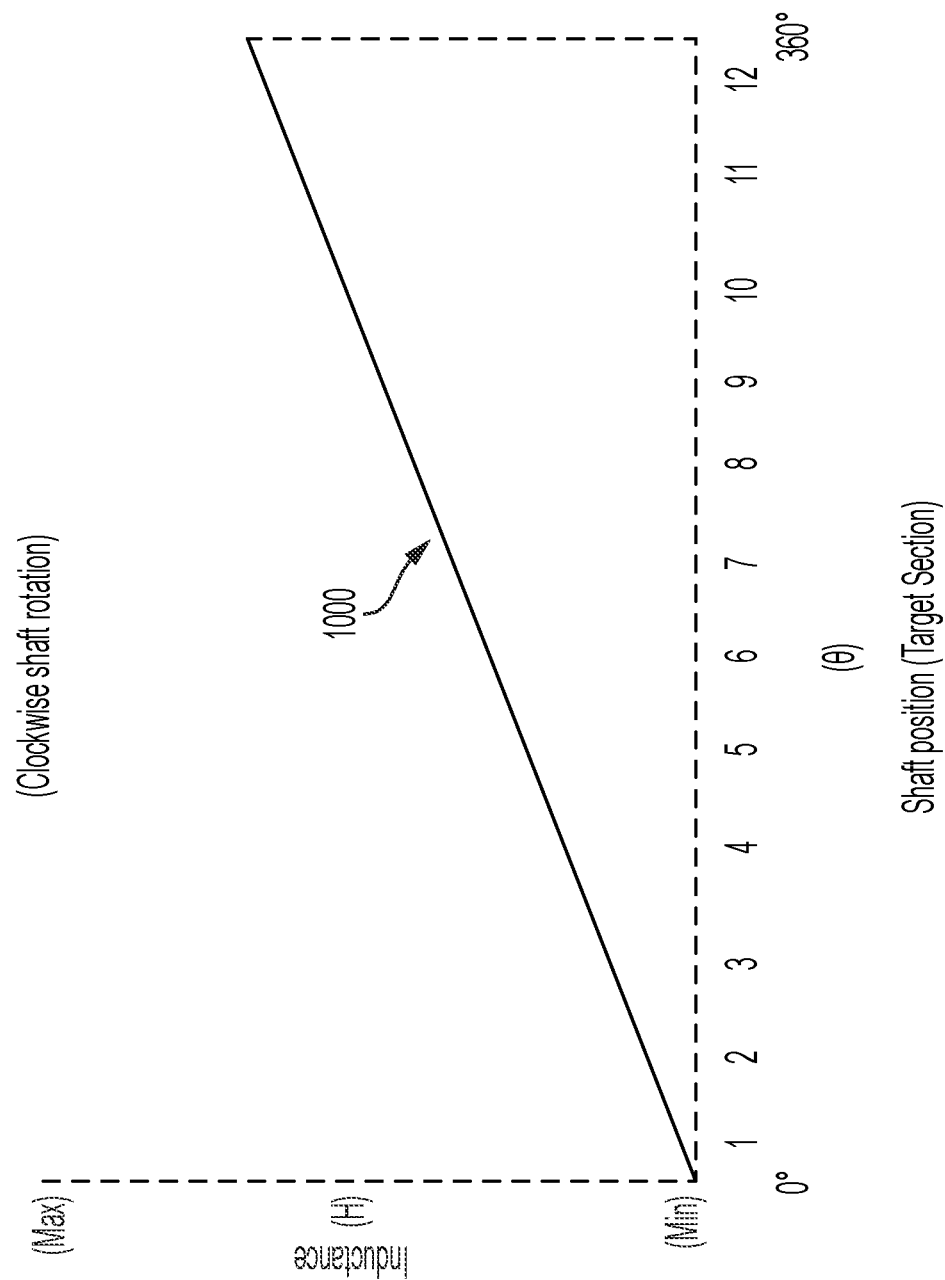
FIG. 10 is a diagram of a signal output by the proximity sensor in response to monitoring the target element shown in FIG. 9 according to a non-limiting embodiment of the present disclosure.

FIG. 10 illustrates the proximity sensor output signal 1000 generated by the proximity sensor 102 in response to measuring the counter-clockwise rotation of the target element 900 from 0° to 360° as described above with respect to FIG. 9. At 0°, the lowest volume target section 902 (e.g., section 1) of the target element 902 is aligned with the center axis 205 of the proximity sensor 102. As a result, the inductance of the coil 202 is at its minimum (Min). As the shaft 106 rotates clockwise, the target sections 902 increase in volume. Accordingly, the inductance of the coil 202 gradually increases until the largest volume target section 902 (e.g., section 12) of the target element 900 is aligned with the center axis 205. As a result, the inductance of the coil 202 is at its maximum (Max), thereby defining a proximity sensor output signal 1000 having a positive slope. Although the proximity sensor output signal 1000 is described in terms of a clockwise rotation of the target element 900, the target element 900 can be rotated counter-clockwise to generate a proximity sensor output signal 1000 having a negative slope without departing from the scope of the invention.

It should be appreciated that the proximity sensor output signal 1000 illustrated in FIG. 10 is generated using a target element 900 comprising a ferro-magnetic material and a coil 202 of the proximity sensor 102 excited at a low-frequency (e.g., frequency where the effects of magnetic permeability is greater than the effects of eddy current). In another non-limiting embodiment, a target element 900 comprising a non-magnetic metallic material and a coil 202 excited at a low-frequency (e.g., frequency where the effects of magnetic permeability is greater than the effects of eddy current) can result in a measured inductance that decreases as the shaft 106 rotates clockwise. As a result, the output signal 900 will have a negative slope.

In another embodiment, the target element 900 can comprise a ferro-magnetic material and the coil 202 of the proximity sensor 102 can be excited at a high-frequency (e.g., frequency where the effects of magnetic permeability is less than the effects of eddy current). Accordingly, the measured inductance may decreases as the shaft 106 rotates clockwise. As a result, the output signal 1000 will have a negative slope.

Figure 11:
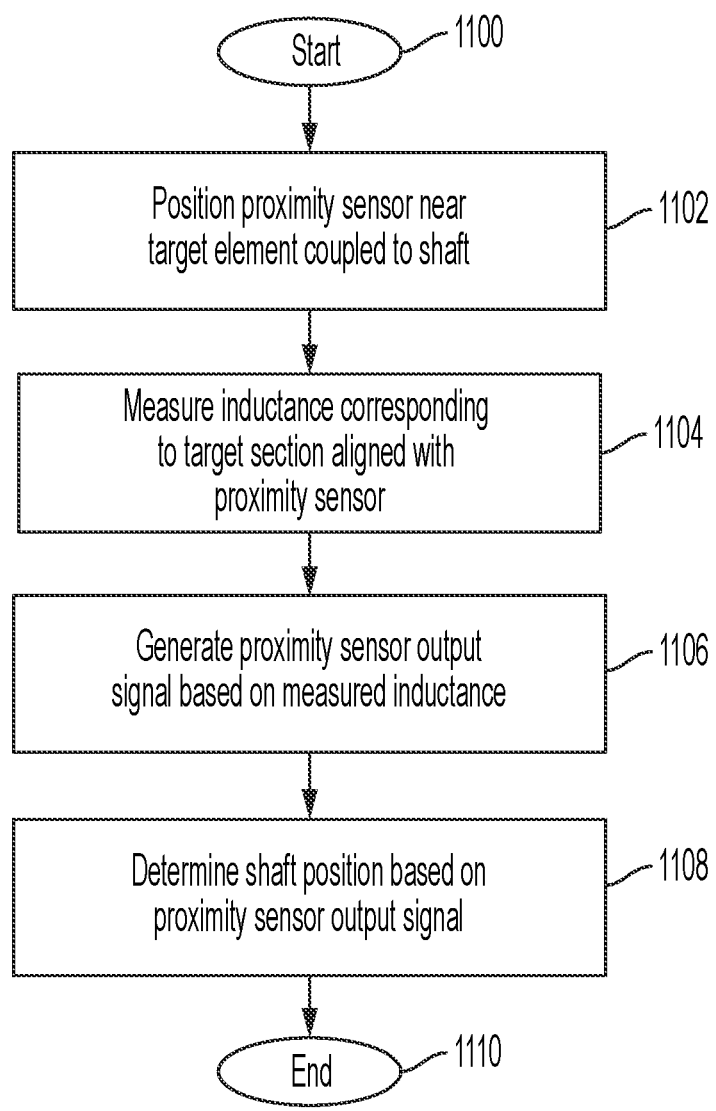
FIG. 11 is a flow diagram illustrating a method of determining a rotational position of a shaft according to a non-limiting embodiment of the present disclosure.

With reference now to FIG. 11, a method of determining position of a shaft is illustrated according to a non-limiting embodiment of the present disclosure. The method begins at operation 1100 and at operation 1102 a proximity sensor is positioned near a target element coupled to a shaft. At operation 1104, the proximity sensor measures the inductance corresponding to a given target section that is aligned with the proximity sensor. At operation 1106, the proximity sensor generates a proximity sensor output signal based a measured inductance corresponding to a given target section included in target element that is coupled to the shaft. At operation 1108, the shaft position is determined based on the proximity sensor output signal, and the method ends at operation 1110.

Figure 12:
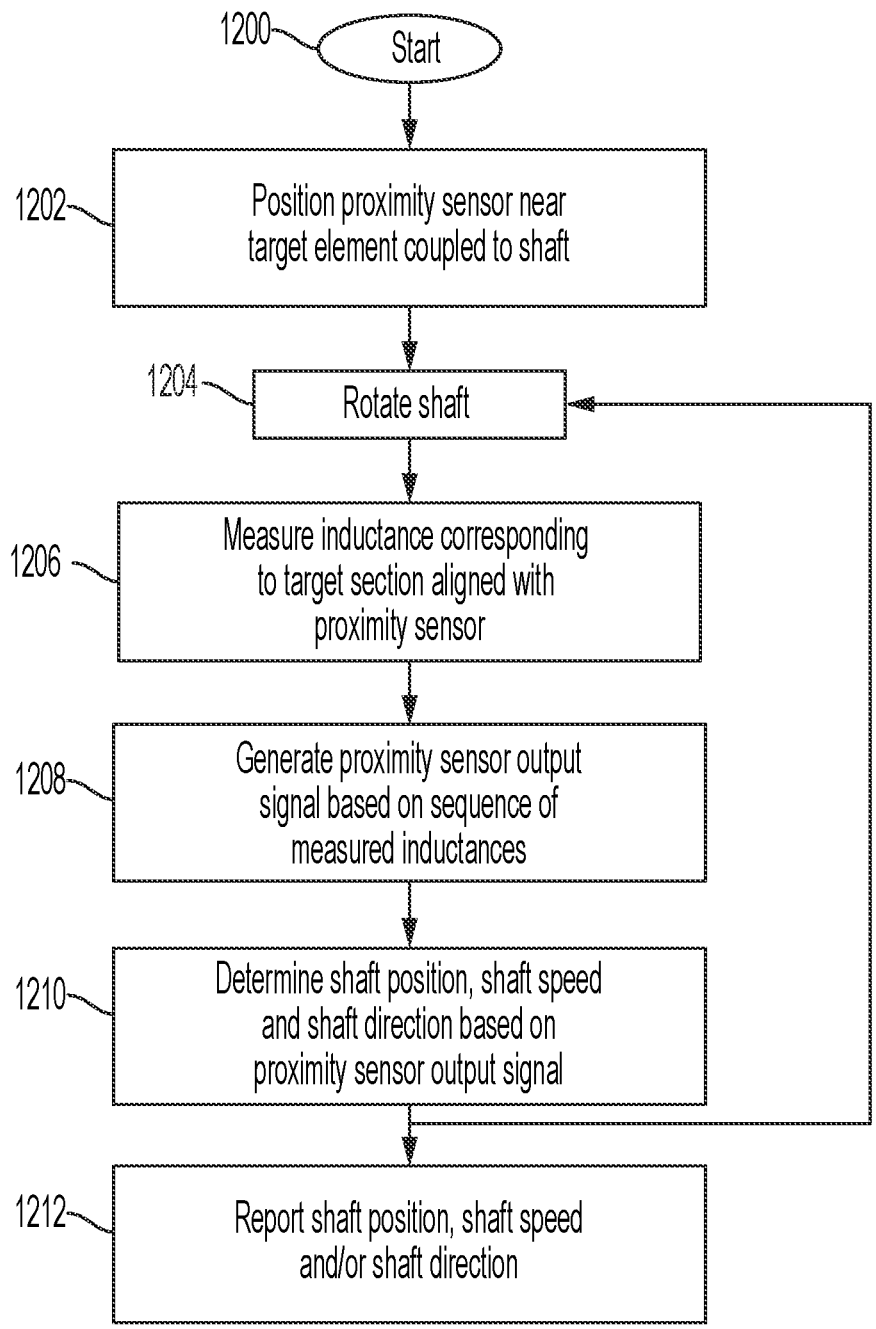
FIG. 12 is a flow diagram illustrating a method of determining position, speed and direction of a rotating shaft according to a non-limiting embodiment of the present disclosure.

Turning to FIG. 12, a method of determining position, speed and direction of a rotating shaft is illustrated according to a non-limiting embodiment of the present disclosure. The method begins at operation 1200 and at operation 1202 a proximity sensor is positioned near a target element coupled to a shaft. At operation 1204, the shaft is rotated (i.e., in a clockwise direction or counter-clockwise). At operation 1206, the proximity sensor measures the inductance corresponding to a given target section that is aligned with the proximity sensor. At operation 1208, the proximity sensor generates a proximity sensor output signal based on a sequence of measured inductances corresponding to rotated target sections rotating along with the shaft. At operation 1210, the shaft position, the shaft direction and/or the shaft speed is determined based on the proximity sensor output signal, and the method returns to operation 1204 to rotate the shaft. At operation 1212, the shaft position, the shaft direction and/or the shaft speed is reported, e.g., to a display screen or a graphic user interface (GUI). As the shaft continues rotation (e.g., clockwise or counter-clockwise), the changed shaft position, shaft direction and/or the shaft speed can be actively reported in real-time.

As described herein, various non-limiting embodiments of the disclosure provide a shaft monitoring system that employs a proximity sensor configured to measure rotation of a proximity sensor target element (hereinafter referred to a target element) coupled to a rotating shaft. The target element includes a series of individual target sections that are sensed by the proximity sensor as the shaft rotates. The profiles and/or volumes of the individual target sections and/or distance between the target sections and the proximity sensor continuously change as the target element extends from the first individual target section included in the series to the last individual target section. The volume of each sensed target section with respect to the proximity sensor and/or the distance between each target section and the proximity sensor produces a different inductance as indicated by the proximity sensor output signal. Over a full rotation of the shaft, the proximity sensor output signal itself not only indicates a position of the shaft, but also can indicate both the rotational direction and rotational speed of the shaft.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A shaft monitoring system comprising:
    a rotatable shaft including a target element coupled thereto that rotates along with the shaft, the target element including a series of individual target sections arranged sequentially one after another;
    a proximity sensor located adjacent to the target element, the proximity sensor configured to measure an inductance of the target element based on one or both of the volume of the target element indicated by the individual target section sensed by the proximity sensor and a distance between the individual target section of the target element and the proximity sensor, and to generate a proximity sensor output signal based on the measured inductance; and
    a signal processing system in signal communication with the proximity sensor, the signal processing system configured to determine at least one of a position of the shaft, a rotational speed of the shaft, and a rotational direction of the shaft based on the proximity sensor output signal,
    wherein the individual target sections directly contact one another such that each of the different measured inductances corresponds to a respective rotational position of the shaft, and wherein the different measured inductances increase according to a positive constant slope defined as a change in the inductance of the target elements with respect to a change in the rotational position of the shaft in response to rotating the shaft in a first direction, and wherein the different measured inductances decrease according to a negative constant slope defined as a change in the inductance of the target elements with respect to a change in the rotational position of the shaft in response to rotating the shaft in a second direction opposite the first direction.

2. The shaft monitoring system of claim 1, wherein the volume of the target element continuously changes as the target element extends from a first end of the target element to an opposing second end of the target element.

3. The shaft monitoring system of claim 2, wherein a proximity of the volume with respect to the proximity sensor produces a respective measured inductance, and the respective measured inductance corresponds to a respective rotational position of the shaft.

4. The shaft monitoring system of claim 3, wherein rotating the shaft rotates the target element and varies the volume of the target element aligned with the proximity sensor to change the measured inductance.

5. The shaft monitoring system of claim 4, wherein the position of the shaft, the rotational speed of the shaft, and the rotational direction are determined in response to rotating the shaft.

6. The shaft monitoring system of claim 2, wherein a minimum volume of the target element is at the first end and a maximum volume is located at the second end.

7. The shaft monitoring system of claim 6, wherein the target element extends three-hundred and sixty (360) degrees from the first end to the second end to define a circumferential profile.

8. The shaft monitoring system of claim 1, wherein the distance changes based on a rotational position of the shaft.

9. The shaft monitoring system of claim 8, wherein rotating the shaft produces different distances between the target element and the proximity sensor to produce different measured inductances.

10. A method of monitoring a rotatable shaft, the method comprising:
  positioning a target element coupled to the rotatable shaft a distance away from a proximity sensor, the target element including a series of individual target sections arranged sequentially one after another;
  measuring, via the proximity sensor, an inductance based on one or both of a volume of the target element indicated by the individual target section sensed by the proximity sensor and a distance between the individual target section of the target element and the proximity sensor;
  generating a proximity sensor output signal based on the measured inductance;
  determining, via a signal processing system in signal communication with the proximity sensor, at least one of a position of the shaft, a rotational speed of the shaft, and a rotational direction of the shaft based on the proximity sensor output signal;
  determining a respective rotational position of the shaft based on a respective different measured inductance,
  wherein the individual target sections directly contact one another such that each of the different measured inductances corresponds to a respective rotational position of the shaft, and wherein the different measured inductances increase according to a positive constant slope defined as a change in the inductance of the target elements with respect to a change in the rotational position of the shaft in response to rotating the shaft in a first direction, and wherein the different measured inductances decrease according to a negative constant slope defined as a change in the inductance of the target elements with respect to a change in the rotational position of the shaft in response to rotating the shaft in a second direction opposite the first direction.

11. The method of claim 10, wherein the volume of the target element continuously changes as the target element extends from a first end of the target element to an opposing second end of the target element.

12. The method of claim 11, further comprising:
  producing a respective measured inductance based on a proximity of the volume with respect to the proximity sensor; and
  determining a respective rotational position of the shaft based on the respective measured inductance.

13. The method of claim 12, further comprising:
  rotating the shaft so as to rotate the target element;
  and varying the volume of the target element aligned with the proximity sensor in response to rotating the target element to change the measured inductance.

14. The method of claim 13, further comprising determine the position of the shaft, the rotational speed of the shaft, and the rotational direction in response to rotating the shaft.

15. The method of claim 11, wherein a minimum volume of the target element is at the first end and a maximum volume is located at the second end.

16. The method of claim 15, wherein the target element extends three-hundred and sixty (360) degrees from the first end to the second end to define a circumferential profile.

17. The method of claim 10, further comprising changing the distance based on a rotational position of the shaft.

18. The method of claim 17, further comprising producing different distances between the target element and the proximity sensor in response to rotating the shaft, and producing different measured inductances based on the different distances.

* * * * *